UNITED STATES PATENT OFFICE.

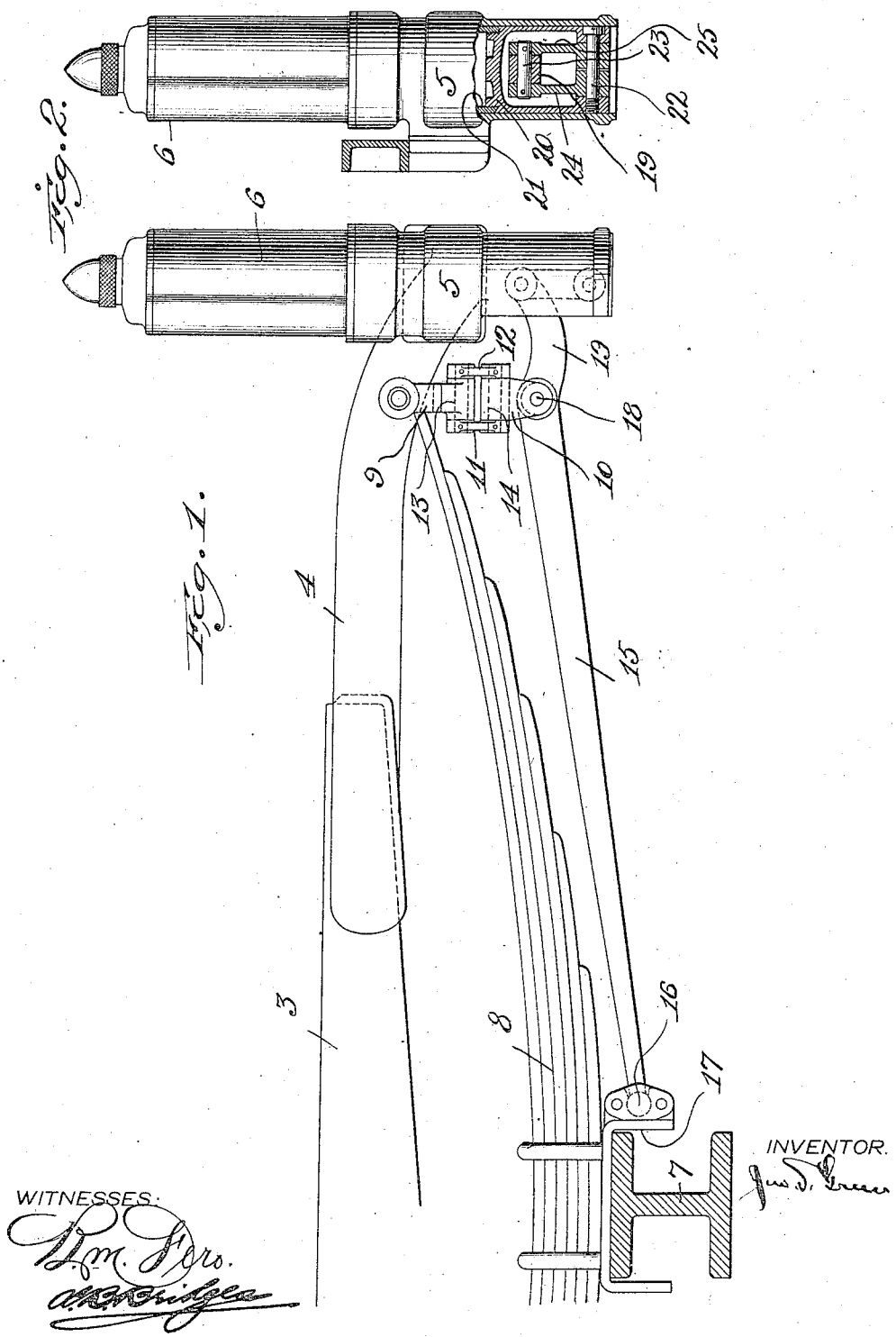

JONATHAN S. GREEN, OF PITTSBURGH, PENNSYLVANIA, ASSIGNOR TO WESTINGHOUSE AIR SPRING COMPANY, A CORPORATION OF PENNSYLVANIA.

VEHICLE AIR-SPRING.

1,149,363.  Specification of Letters Patent.  Patented Aug. 10, 1915.

Application filed October 24, 1912. Serial No. 727,551.

*To all whom it may concern:*

Be it known that I, JONATHAN S. GREEN, a citizen of the United States, and a resident of Pittsburgh, in the county of Allegheny and State of Pennsylvania, have made a new and useful Invention in Vehicle Air-Springs, of which the following is a specification.

This invention relates to vehicle springs and more particularly to means for mounting and connecting up one element of a telescopic air spring or cushion device to the steel springs of a vehicle in such a way that the cushion device will work in series with the steel springs and the strains due to the twisting of the steel springs will not be transmitted to the cushion device.

An object of this invention has been to provide a connecting device or means between one element of a telescopic air spring or cushion device and the steel springs of a vehicle which will prevent straining of the cushion device by the steel springs as the same are twisted and which will also permit limited lateral movement between the load-carrying platform of the vehicle and the running gear of the same. This, as well as other objects which will readily appear to those skilled in this art, I attain in the device described in the specification and illustrated in the drawings accompanying the same and forming a part of this application, and in the several views of which like elements are denoted by like characters.

In the drawings: Figure 1 is a view in side elevation of a portion of a vehicle frame, a telescopic air spring or cushion device, and this invention connecting the steel spring of the vehicle to the cushion device; and Fig. 2 is an end view partially in section and partially in elevation of the same.

To the frame 3 of a vehicle such as an automobile or motor truck, a bracket 4 is secured and to the outer end of this bracket the guide member 5 of an air spring or fluid cushion device 6 is secured. The air spring or fluid cushion device is preferably such as is broadly illustrated in Patent No. 1,036,043, issued to George Westinghouse on August 20, 1912.

The axle 7, which may be either the front or rear axle of the vehicle, carries a steel leaf spring 8 of ordinary construction. Bolted to the eye at the rear of the steel spring is a universal shackle member composed of element 9 pivotally mounted on the steel spring, and a member 10 connected to member 9 by means of links 11 and 12 and pins 13 and 14.

A lever arm 15, having a ball and socket connection 16 with a pad 17 secured between steel spring 8 and axle 7, is pivotally connected by means of a pin 18 to member 10 of the universal shackle. Short arm 19 of lever 15 extends into crosshead member 20 of the movable element 21 of the air spring or cushion device, and by means of a bolt 22, pin 23, and links 24 and 25 is shackled to the crosshead.

Having thus described my invention, what I claim is:

1. The combination with the load platform of a vehicle, of a leaf spring carried by the running gear, a telescopic air spring one element of which is secured to said load platform, a lever connected to another element of said air spring and to the running gear, and a shackle connecting said lever with one end of said leaf spring.

2. In combination with the frame and axle of a vehicle, a cushion member mounted on said frame, a resilient metal spring interposed between said frame and said axle, and a link mounted on said cushion device and pivotally connected at two points with said resilient metal spring.

3. In combination with the frame and axle of a vehicle, a cushion member mounted on said frame, a resilient metal spring interposed between said frame and said axle, and a link mounted on said cushion member and overlapping said metal spring, the ends of said link and said metal spring being respectively pivotally connected to an intermediate portion of the other.

4. In combination with the frame and axle of a vehicle, a cushion member mounted on said frame, a resilient metal spring interposed between said frame and said axle, and a link mounted on said cushion member and connected intermediate its ends by means of a universal pivot joint to said metal spring, the end of said link being pivotally connected with said resilient metal spring intermediate of the ends of the latter.

5. In combination with the frame and axle of a vehicle, a cushion member mounted on said frame, a resilient metal spring interposed between said frame and said axle, and a link pivotally connected to said cushion member and overlapping said metal spring, the free end of said link being pivotally connected to an intermediate portion of said metal spring and the free end of said metal spring being pivotally attached to said link.

6. In combination with the frame and axle of a vehicle, a cushion member mounted on said frame, a resilient metal spring interposed between said frame and said axle, and a link pivotally connected to said cushion member and overlapping said metal spring, the free end of said link being pivotally connected to said metal spring at an intermediate point and the free end of said metal spring being attached by a universal pivot joint to said link at an intermediate point of the latter.

7. In combination with the frame and axle of a vehicle, a cushion member mounted on said frame, a resilient metal spring interposed between said frame and said axle, and a link pivotally connected to said cushion member and overlapping said metal spring, the free end of said link being connected to said spring at an intermediate point by a sliding pivotal joint transversely flexible and the free end of the spring being pivotally attached to said link at an intermediate point of the latter.

8. In combination with the frame and axle of a vehicle, a cushion member mounted on said frame, a resilient metal spring interposed between said frame and said axle, and a link pivotally connected to said cushion member and overlapping said metal spring, the free end of said link being connected to said spring at an intermediate point by a sliding pivotal joint laterally flexible and the free end of said spring being attached to said link by a universal pivot joint at an intermediate point of the latter.

In testimony whereof, I have hereunto subscribed my name this 23rd day of October, 1912.

JNO. S. GREEN.

Witnesses:
C. W. McGHEE,
ADA ROMIG.